United States Patent [19]

Border

[11] Patent Number: 4,992,133
[45] Date of Patent: Feb. 12, 1991

[54] APPARATUS FOR PROCESSING COMPOSITE MATERIALS

[75] Inventor: John N. Border, Sandia Park, N. Mex.

[73] Assignee: PDA Engineering, Costa Mesa, Calif.

[21] Appl. No.: 252,652

[22] Filed: Sep. 30, 1988

[51] Int. Cl.[5] .......................... B29C 65/32; B30B 5/04
[52] U.S. Cl. ................................. 156/498; 100/93 P; 100/156; 156/429; 156/499; 156/555; 156/583.3; 156/583.5; 156/583.91; 219/10.53; 219/10.61 R
[58] Field of Search .............. 156/523, 574, 361, 429, 156/583.1, 583.3, 583.5, 498, 555, 499, 583.91, 582; 100/93 P, 93 RP, 156; 425/364 R; 219/10.53, 10.61 R, 10.75, 10.69

[56] References Cited

U.S. PATENT DOCUMENTS

| | | | |
|---|---|---|---|
| 2,107,249 | 2/1938 | Hepke | 156/583.5 |
| 2,430,285 | 11/1947 | Ferris | 219/10.69 |
| 2,442,443 | 6/1948 | Swallow | 100/93 RP |
| 3,467,806 | 9/1969 | Dixon | 219/10.73 |
| 3,555,231 | 1/1971 | Laurentie | 219/10.53 |
| 3,597,567 | 8/1971 | Johnson | 219/10.55 A |
| 3,702,912 | 11/1972 | Greenberger | 219/10.61 R |
| 3,716,689 | 2/1973 | Meenen | 219/10.61 R |
| 3,883,386 | 5/1975 | Garbini et al. | 156/583.5 |
| 3,952,421 | 4/1976 | Wilson et al. | 219/10.61 R |
| 3,953,701 | 4/1976 | Manwaring | 219/10.81 |
| 4,084,999 | 4/1978 | Rucker | 156/555 |
| 4,246,461 | 1/1981 | Jeppson | 219/10.53 |
| 4,273,981 | 6/1981 | Nopper | 219/10.491 |
| 4,304,975 | 12/1981 | Lenk et al. | 219/10.492 |
| 4,478,669 | 10/1984 | Zeller et al. | 156/379.7 |
| 4,541,889 | 9/1985 | Held | 156/583.5 |
| 4,573,402 | 3/1986 | Sharma et al. | 100/93 RP |
| 4,581,512 | 4/1986 | McGinn et al. | 219/10.491 |
| 4,622,445 | 11/1986 | Matsen | 219/10.41 |
| 4,711,168 | 12/1987 | Held | 156/583.5 |
| 4,734,552 | 3/1988 | Brolin | 219/10.53 |
| 4,826,560 | 5/1989 | Held | 156/583.5 |

*Primary Examiner*—Michael G. Wityshyn
*Attorney, Agent, or Firm*—Gordon L. Peterson

[57] ABSTRACT

An apparatus for bonding together at least two composite tapes comprising a tape head, a support surface adjacent the tape head and a supply system for supplying first and second composite tapes between the tape head and the support surface. The tape head includes a heating section and a pressure section pivotally coupled to the heating section. The heating section includes a heater for heating the tapes, and the pressure section includes a system for applying a force for urging the tapes against the support surface.

17 Claims, 2 Drawing Sheets

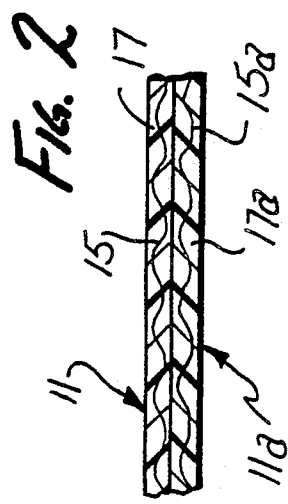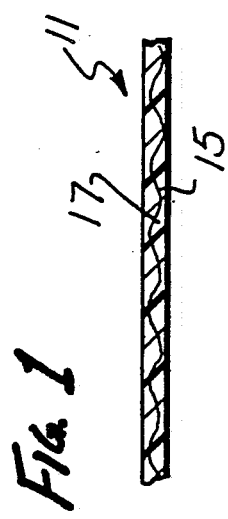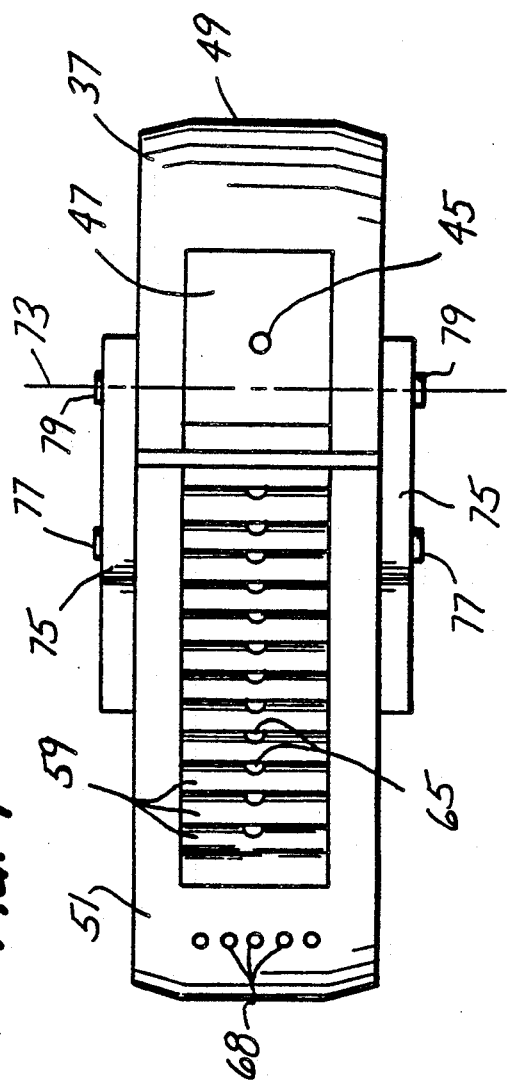

APPARATUS FOR PROCESSING COMPOSITE MATERIALS

This invention was made with Government support under Contract No. F3361587C5277 awarded by Aeronautical Systems Division, Wright Patterson Air Force Base, Ohio. The Government has certain rights in this invention.

BACKGROUND OF THE INVENTION

A composite material comprises an appropriate resin and one or more fiber reinforcements. The resin may be either thermoplastic or thermosetting, and the fibers may be of various different materials depending upon the properties desired for the resulting composite material. For example, the fibers may be of an electrically conductive material, such as graphite.

Composite materials can be provided in various different forms. The composite material comprises a matrix of an appropriate resin and reinforcing fibers. The composite material may be provided in sheet or tape form. In another form, the composite material comprises yarns that are coated with a powder of the matrix resin or fibers.

It is often necessary or desirable to process composite materials of this type utilizing heat and pressure. For example, it may be desirable to process the composite material utilizing a controlled thermal cycle to alter the properties of the resin. A tape or sheet of composite material can be processed to change the shape of the sheet. Finally, the composite material may be processed to bond together multiple tapes of sheets or multiple powder-coated yarns.

One kind of known apparatus for processing composite materials includes rigid blocks or rollers for providing pressure after the composite material has been heated. These rigid members cannot conform to different contours, nor can they provide as uniform a pressure as is desired. Heating of the composite material in these apparatuses is accomplished by conduction from a hot block, radiation from a light source or by superheated air. These heating techniques are limited as to the speed that heating can occur in that heat must be conducted into the composite material from the surface.

SUMMARY OF THE INVENTION

This invention provides an apparatus for use in processing composite material which generally overcomes the disadvantages noted above and provides other advantageous features. Thus, this invention provides a tape head which has several features which adapt it to conform to tape support surfaces of different configurations. In addition, the pressure applied to the composite material can be held more constant and more uniform. Also, the method for applying heat allows heat to be applied at a very high rate.

The apparatus includes a heating section and a pressure and/or cooling section having a pressure surface useful in applying a force to the composite material. The apparatus is designed so that the composite material moves under the heating and cooling sections on a continuous basis. The heating section includes a heater for heating the composite material. The pressure section includes pressure applying means for applying a force to the composite material to change the shape of the composite material or to bond multiple tapes or yarns of the composite material together. The cooling section allows the composite to be cooled in a controlled fashion.

One feature of this invention that enables the tape head to be used with tape support surfaces of different configurations is that the heating section is pivotally coupled to the pressure section for pivotal movement about a pivot axis. This permits the angular orientation of the heating and pressure sections to be varied relative to each other so that they can conform to different tape support surfaces, such as round and flat. In this way, the heating section can be maintained in a constant orientation relative to the composite material.

This invention also eliminates the rigid blocks and rollers used heretofore for applying pressure to the composite material. Rather, this invention employs pressure applying means which can conform to the support surface. This not only allows the pressure applying means to be used with support surfaces of different configurations, but also tends to assure a more constant and even distribution of pressure over the full surface of the composite material.

In a preferred embodiment, pressure section conformity to the support surface is achieved by employing a flexible member which defines the pressure surface and a plurality of pressure plates acting against the flexible member. The pressure plates are movable relative to each other, and this, as well as the flexibility of the flexible member, enables the pressure section to conform to the support surface and to insure a constant, evenly distributed pressure over the surface of the composite material. The flexible member may include a flexible rider and/or a movable endless resilient belt.

The apparatus of this invention also provides for cooling of the composite material. Preferably, cooling is accomplished by means for supplying a cooling gas to the pressure section to cool the composite material. Passage means are provided in the pressure section and the pressure plates for supplying a cooling gas to the pressure section. The pressure plates define portions of the cooling gas passages between adjacent pressure plates.

Another feature of this invention is that a gas under pressure can be used for applying a force to the pressure surface, and this can be carried out by using the gas under pressure to load the pressure members against the flexible member. The pressure section preferably includes a chamber in which the plates are movable and a passage leading to the chamber so that the gas under pressure can be supplied to the chamber to urge the plates against the flexible member.

For those cases in which the reinforcing fibers are electrically conductive, the heater preferably is an induction heater. By using induction heating, the electrically conductive fibers can be heated very rapidly due to the fact that the electromagnetic field surrounding the induction coil penetrates into the composite material to cause volumetric heating of the composite.

The apparatus also includes means defining a support surface adjacent the tape head and means for supplying composite material between the tape head and the support surface. The supply means may include, for example, one or more storage reels on which the composite material is wound, and the support surface may be defined by a flat stationary surface, a curved stationary surface, a rotating peripheral surface of a mandrel, etc. The tape head preferably includes a movable endless resilient belt. The belt lies between the pressure applying means and the support surface and also between the heater and the support surface. The purpose of the belt is to protect the fibers from abrasion during processing and to promote a uniform pressure over the surface of the composite material during processing.

The invention, together with additional features and advantages thereof, may best be understood by reference to the following description taken in connection with the accompanying illustrative drawing.

BRIEF DESCRIPTION OF THE DRAWING

FIG. 1 is a sectional view of a tape of the type with which the present invention can be used.

FIG. 2 is a sectional view illustrating two of the tapes as they are initially placed in contact by the apparatus of this invention.

FIG. 4 is a bottom plan view of the tape head with the belt and belt rider removed.

DESCRIPTION OF THE PREFERRED EMBODIMENT

Figure 3:
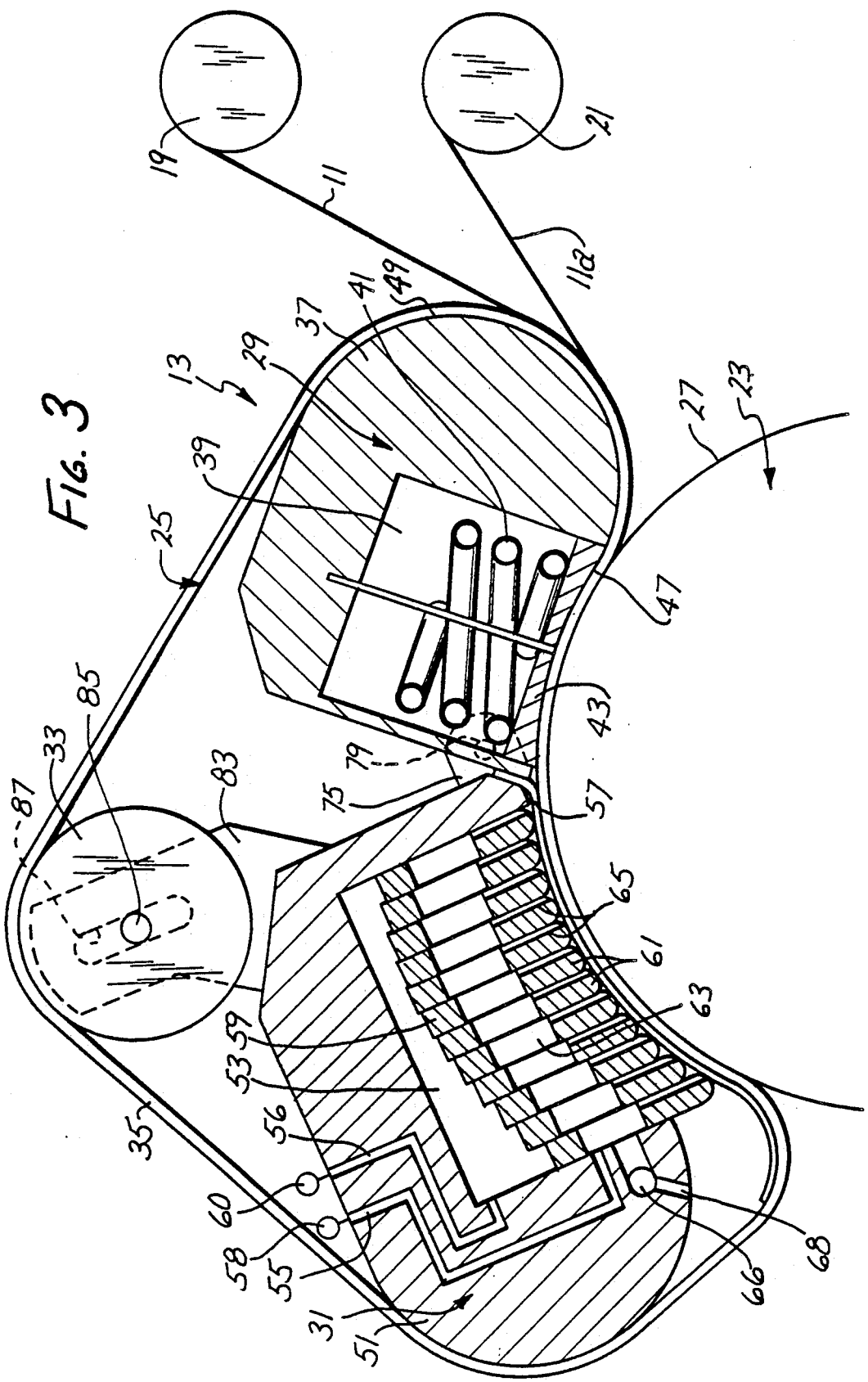
FIG. 3 is a schematic view partially in section of an apparatus constructed in accordance with the teachings of this invention.

FIG. 1 shows, by way of example, a tape 11 of the type which can be used with an apparatus 13 of this invention. The tape 11 comprises a mat 15 of reinforcing fibers and a resin 17 impregnated into the mat. The mat 15 may be of woven or nonwoven construction and may be constructed of various materials, such as metal-coated glass, with graphite being preferred. The resin 15 may be a thermoplastic, such as polyetheretherketone or a thermosetting resin.

FIG. 2 shows the tape 11 in face-to-face relationship with an identical tape 11a, and portions of the tape 11a corresponding to portions of the tape 11 are designated by corresponding reference numerals follows by the letter "a." FIG. 2 shows the relationship of the tapes 11 and 11a as they are processed by the apparatus 13.

The apparatus 13 comprises storage reels 19 and 21 on which the tapes 11 and 11a are wound, a take-up mandrel 23 and a tape head 25. The reels 19 and 21 and the mandrel 23 are mounted for rotational movement about parallel, horizontal axes in a conventional manner, and the tapes 11 and 11a extend from their respective storage reels to the mandrel 23 on which they are wound. Various conventional techniques can be used to move the tapes 11 and 11a from the storage reels 19 and 21 to the mandrel 23. For example, if the mandrel has a cylindrical shape, a motor (not shown) can drive the mandrel 23 at an appropriate velocity, and the storage reels 19 and 21 may include suitable brakes for retarding the rotational movement of these reels so that the tapes move from the storage reels to the mandrel 23 at the desired speed and in the desired manner. The mandrel 23 has a peripheral surface or support surface 27 which is relatively hard and rigid. The storage reels 19 and 21 and the mandrel 23 constitute means for supplying the tapes 11 and 11a between the tape head 25 and the support surface 27. If the mandrel is of a shape that cannot be rotated, then the mandrel is kept stationary while the tape head is moved by any suitable means across the mandrel to apply pressure to the tape head. In other words, all that is needed is relative movement between the tapes 11, 11a and the tape head 25, and this can be brought about by moving either, or both, of the tapes 11, 11a and the tape head 25.

The tape head 25 includes a heating section 29, a pressure section 31, an idler roller 33 and a movable, endless, flexible belt 35. The heating section 29 includes a body 37 having a cavity 39, a heater in the form of an induction heater 41 in the cavity 39, a heat conductive member 43 closing the lower end of the cavity 39 and a temperature sensor 45 (FIG. 4) at or adjacent to a curved lower surface 47 of the heat conductive member 43. The heat conductive member is not electrically conductive and is a good thermal conductor. Alumina or beryllia are the preferred materials for the heat conductive member. If the resilient belt 35 is employed, then the heating surface is defined by the outer surface of the portion of the belt 35 contiguous the surface 47. If the belt 35 is not provided, then the heating surface is defined by the lower surface 47. The resilient belt 35 is provided to protect the composite material from abrasion and to promote a uniform application of pressure across the surface at the composite material. Preferably, the belt 35 is constructed of at least one layer of a resilient material, such as silicone rubber. The thickness of the silicone rubber is chosen to provide compressibility to conform to the surface roughness at the composite material.

The body 37 has a curved guide surface 49 for the belt 35, which preferably conforms to the curvature of the support surface 27. Although the heater 41 may be of various different kinds, such as an infrared lamp or a laser, an induction heater is preferred for use with the tape 11 when the tape 11 incorporates electrically conductive reinforcing fibers, such as graphite fibers. The heater 41 is suitably mounted within the cavity 39 and positioned adjacent the heat conductive member 43.

When using an induction heater, the body 37 is preferably constructed of a nonelectrically conductive material, such as a ceramic, so that the electromagnetic field surrounding the induction heater will penetrate into the pressure section to create a situation where heat and pressure are applied simultaneously. The simultaneous application of heat and pressure is particularly effective for processing thermoplastic composite material. The tape head 25 may be of one piece integral construction or assembled from two or more body sections. The integral construction shown in FIGS. 3 and 4 is purely illustrative.

The temperature sensor 45 may be, for example, an optical temperature probe or a thermocouple. The sensor 45 measures the temperature of the belt 35, and this information can be used in a feedback loop (not shown) to control the induction heater 41.

The pressure section 31 includes a body 51 having a chamber 53 with an open bottom and passages 55 and 56 leading to the chamber so that a cooling gas and a gas under pressure, respectively, can be supplied to the chamber from sources 58 and 60 of cooling gas and pressurizing gas. The pressure section 31 also includes pressure applying means for applying a force to a pressure surface of a flexible member. Depending on the construction, the flexible member may be provided by the belt 35 and/or a belt rider 57. The belt rider 57 is flexible, and may be constructed of a suitable plastic or other flexible material. The belt rider 57 is attached to one end of the body 51 and extends completely across and beyond the open bottom of the chamber 53. If the belt 35 is omitted, then the flexible member is the belt rider and the pressure surface is defined by the outer surface of the belt rider 57. If the belt 35 and the belt rider 57 are used, then the flexible member comprises the belt rider and a portion of the belt and the pressure surface is defined by the outer surface of the belt to the extent that such outer surface of the belt is at the open bottom of the chamber 53.

Although the pressure applying means can take different forms, in this embodiment, it includes a plurality of identical pressure plates 59 movable independently in the chamber 53. Each of the pressure plates 59 is generally in the form of a rectangular solid having a rounded, semi-cylindrical nose 61 engaging the belt rider 57, an opening 63 and a groove 65 leading from the opening 63 to the nose 61. With the pressure plates 59 stacked together in the chamber 53 like a deck of cards, the plates project out of the open end of the chamber, and each of the grooves 65 cooperates with a planar surface of the adjacent plate 59 to form a portion of a cooling gas passage which leads from the opening 63 to the nose 61. Consequently, the cooling gas can be transmitted from the source 58 through the passage 55, the openings 63, which are in registry, and the grooves 65 to the belt rider 57, which is a good conductor of heat and which is very close to the tapes 11 and 11a which are to be cooled. Cooling gas also passes through a passage 66 in the body 51 to cooling orifices 68 in the body 51. The cooling gas can escape to the atmosphere after it leaves the pressure section 31 because there are no sides on the tape head 13 below the body 51 that would prevent it from escaping.

Another feature of the invention is that the pressure plates 59 are responsive to the gas under pressure from the source 60 for urging the tapes 11 and 11a toward the support surface 27 to thereby apply a compressive load to the tapes. Thus, when the gas under pressure is applied to the upper end of the chamber 53, it acts against the upper surface 67 of each of the pressure plates 59 to thereby urge the pressure plates downwardly as viewed in FIG. 3 and against the flexible belt rider 57. By using a tape head which incorporates both pressure plates and a resilient belt, the tape head can conform to both the large-scale undulations at the support surface and the small-scale roughness at the tape, thereby creating a very uniform pressure on the tape surface.

Means is provided for pivotally coupling the heating section 29 to the pressure section 31 for pivotal movement about a pivot axis 73 (FIG. 4) which extends transverse to the direction of movement of the tapes 11 and 11a over the tape head 25. Although the coupling means can take different forms, in this embodiment, it includes plates 75 suitably coupled to the body 51 as by threaded fasteners 77 (FIG. 4) and hinge pins 79 for pivotally joining the plates 75 to the body 37. With this construction, the angular orientation of the heating section 29 and the pressure section 31 can be varied relative to each other so that the tape head 25 can be used with support surfaces 27 of different configurations, e.g., the circular configuration of FIG. 3, flat, etc. The heating section 29 and the pressure section 31 can pivot freely relative to each other about the pivot axis 73 so they can readily conform to the shape of the support surface 27. The heating section 29 and the pressure section 31 are preferably not locked in a specified angular position during use of the apparatus 13.

The idler roller 33 is rotatably mounted on one or more arms 83 (only one being shown in FIG. 3) which is coupled to the body 51. The idler roller 33 is rotatable about a pin 85 receivable in a slot 87 and movable in the slot to adjust the tension on the belt 35 in a conventional manner. The pin 85 can be fixed against translation in the slot 87 in any suitable conventional manner while allowing rotation of the idler roller 33 about the pin. If the belt 35 is eliminated, then the idler roller 33 and its accompanying mounting structure can also be eliminated.

The bodies 37 and 51, the pressure plates 59, the heat conductive member 43, the belt 35, and the belt rider 57 are all constructed of electrically non-conductive material. When so constructed, they will not be directly heated by the induction heater 41. For example, the body 51 and the plates 59 may be constructed of a suitable ceramic, and the belt 35 may be constructed of a suitable plastic, such as silicone PTFE. Like the body 37, the body 51 may be of one-piece integral construction or constructed of multiple body sections.

In use of the apparatus 13, the tapes 11 and 11a are wound onto the mandrel 23 at the desired rate. The space between the belt 35 and the support surface 27 is just wide enough to accommodate the combined thicknesses of the tapes 11 and 11a. Accordingly, the belt 35 is driven in the direction of the arrow by the friction between the belt 35, the tapes 11 and 11a, and the support surface 27. Of course, more than two of the tapes 11 and 11a can be simultaneously bonded together with the apparatus 13.

As the tapes 11 and 11a come into confronting relationship with the surface 47, they are heated to a desired temperature by the induction heater 41. The induction heater heats the tapes 11 and 11a, and more particularly, the electrically conductive mats 15 and 15a thereof. The amount of heating can be carefully controlled because of the temperature information from the temperature sensor 45. The heating is sufficient to allow the resins 17 and 17a to flow together and become, in effect, an integral mass.

As the heated tapes 11 and 11a pass beneath the pressure plates 59, the gas pressure acting on the surfaces 67 urges the pressure plates toward the support surface 27 to thereby compressively load the tapes against the support surface. The confronting surfaces of the pressure plates 59 above the opening 63 need not be sealed because any leakage of the pressurizing gas between the plates to the openings 63 simply adds to the volume of cooling gas supplied from the source 58. Any such leakage is minor.

The gas pressure acting on the surfaces 67 can be accurately controlled. Consequently, the pressure plates 59 exert a constant, accurately controlled force against the belt rider 57 as a function of the pressure of the gas acting on the surfaces 67. The force applied by the pressure plates is transmitted evenly via the belt rider 57 and the flexible belt 35. In addition because the plates 59 are independently movable, they can conform to various different shapes of support surfaces 27.

The pressure plates 59 force the heated tapes 11 and 11a together so as to make the resin portions thereof a one-piece mass and to initiate cooling of the tapes while they are tightly held together. Cooling is provided by the cooling gas which flows from the source 58 via the passage 55, the opening 63 and the groove 65 to the belt rider 57. The cooling rate is controlled by the thicknesses and material of the belt rider 57 and the belt 35 and by the temperature of the cooling gas. The tapes 11 and 11a, after being formed into a single thicker tape, are wound on the mandrel 23.

Of course, the angular orientation of the pressure section 31 and the heating section 29 can be adjusted about the pivot axis 73 to accommodate support surfaces 27 of different configurations. The individually movable pressure plates 59 can easily conform to, and be used to apply pressure against, support surfaces of different configurations. The apparatus 13 can be used for other kinds of processing of composite materials, such as altering the properties of the resin and/or changing the shape of a tape or sheet.

Although an exemplary embodiment of the invention has been shown and described, many changes, modifications and substitutions may be made by one having ordinary skill in the art without necessarily departing from the spirit and scope of this invention.

I claim:

1. An apparatus for use in processing composite material which includes plastic material, said apparatus comprising:
   an endless flexible belt circumscribing a zone;
   means defining a support surface confronting a region of the belt and adapted to have the composite material pass between the support surface and said region of the belt;
   a heating section including an induction heater in said zone;
   a pressure section including pressure applying means in said zone for urging a section of the belt toward the support surface; and
   means for pivotally coupling the heating section to the pressure section for pivotal movement about a pivot axis whereby the angular orientation of the induction heater and the pressure applying means in said zone can be varied relative to each other.

2. An apparatus as defined in claim 1 wherein the heating section includes an electrically nonconductive member having high thermal conductivity between the induction heater and the region of the belt.

3. An apparatus as defined in claim 1 wherein the pressure applying means includes a plurality of independently movable pressure plates acting against the section of the belt.

4. An apparatus as defined in claim 3 wherein the pressure section includes means defining a chamber in which the plates are movable and a passage leading to the chamber whereby a gas under pressure can be supplied to the chamber to urge the plates against the section of the belt.

5. An apparatus as defined in claim 4 including cooling passage means in the pressure section and the pressure plates for supplying a cooling gas to the pressure section.

6. An apparatus as defined in claim 1 wherein the means defining a support surface includes a mandrel on which the composite material is wound and said mandrel has a peripheral surface which defines the support surface.

7. An apparatus as defined in claim 1 wherein the belt is constructed of a resilient material.

8. An apparatus as defined in claim 1 wherein the belt is nonconductive.

9. An apparatus as defined in claim 1 wherein the belt is constructed of silicone rubber.

10. An apparatus for use in processing composite material which includes plastic material, said apparatus comprising:
    a heating section having a heating surface, said heating section including a heater for heating the heating surface, the heating surface and the composite material being relatively movable;
    a pressure section having a pressure surface, the pressure surface and the composite material being relatively movable;
    said pressure section including pressure applying means for applying a force to the pressure surface;
    said pressure applying means including a flexible member defining the pressure surface and a plurality of independently movable pressure plates acting against the flexible member; and
    cooling passage means in the pressure section and the pressure plates for supplying a cooling gas to the pressure section to cool the composite material.

11. An apparatus as defined in claim 10 wherein the pressure section includes means defining a chamber in which the plates are movable and a passage leading to the chamber whereby a gas under pressure can be supplied to the chamber to urge the plates against the pressure surface.

12. An apparatus as defined in claim 10 wherein the pressure plates define portions of the cooling gas passages between adjacent pressure plates which lead toward the flexible member.

13. An apparatus as defined in claim 10 including a support surface confronting the heating surface and the pressure surface and means for supplying the composite material to the support surface whereby the heater heats the composite material and the pressure applying means forces the composite material against the support surface.

14. An apparatus as defined in claim 10 including an endless resilient belt extending along the heating section and the pressure section and defining the heating surface and the pressure surface and the flexible member includes a flexible rider between the belt and the pressure plates and a portion of said belt.

15. An apparatus for processing composite material which includes plastic material, said apparatus comprising:
    a tape head;
    means defining a support surface adjacent the tape head;
    means for supplying the composite material between the tape head and the support surface;
    said tape head including a heating section, a pressure section and means for pivotally coupling the heating section to the pressure section for pivotal movement about a pivot axis whereby the heating section and the pressure section can be moved toward and away from the support surface;
    said heating section including a heater for heating the composite material and said pressure section including pressure applying means for applying a force for urging the composite material against the support surface; and
    the pressure applying means including a plurality of pressure plates and the apparatus including a source of cooling gas and a cooling gas passage in the pressure section and in said pressure plates for supplying the cooling gas to the pressure section to cool the composite material and means for supplying gas under pressure for urging the pressure plates toward the support surface to thereby apply a compressive load to the composite material.

16. An apparatus as defined in claim 15 wherein the heater is an induction heater.

17. An apparatus for use in processing composite material which includes plastic material, said apparatus comprising:
    a heating section having a heating surface, said heating section including a heater for heating the heating surface, the heating surface and the composite material being relatively movable;

a pressure section having a pressure surface, the pressure surface and the composite material being relatively movable;

said pressure section including pressure applying means for applying a force to the pressure surface;

said pressure applying means including a flexible member defining the pressure surface and a plurality of independently movable pressure plates acting against the flexible member;

the pressure section including means defining a chamber in which the plates are movable and a passage leading to the chamber whereby a gas under pressure can be supplied to the chamber to urge the plates against the pressure surface; and each of the pressure plates having an opening and a groove leading from said opening for the flow of cooling gas.

* * * * *